May 5, 1925. Re. 16,059

R. E. HUNT

TOY BOAT

Original Filed Dec. 24, 1920

INVENTOR

Raymond E. Hunt

BY

Richey, Stoughton & Watts

ATTORNEYS

Reissued May 5, 1925. Re. 16,059

UNITED STATES PATENT OFFICE.

RAYMOND E. HUNT, OF CLEVELAND, OHIO.

TOY BOAT.

Original No. 1,521,185, dated December 30, 1924, Serial No. 432,920, filed December 24, 1920. Application for reissue filed February 2, 1925. Serial No. 6,483.

*To all whom it may concern:*

Be it known that I, RAYMOND E. HUNT, a citizen of the United States, residing at Cleveland, in the county of Cuyahoga and State of Ohio, have invented certain new and useful Improvements in Toy Boats, of which the following is a specification.

The present invention, relating, as indicated to toy boats, is particularly directed to an improved miniature or toy boat constructed to permit of its operation both in water and on a horizontal surface, such, for example, as the floor of a room. A further object of the invention is the provision of such an article that will float evenly in the water and will have the appearance, both in the water and when on the solid surface, of the real ship of which it is a miniature. To the accomplishment of the foregoing and related ends, said invention, then, consists of the means hereinafter fully described and particularly pointed out in the claims.

The annexed drawing and the following description set forth in detail certain mechanism embodying my invention, such disclosed means constituting, however, but one of various mechanical forms in which the principle of the invention may be used.

In said annexed drawing:—

Figure 1:
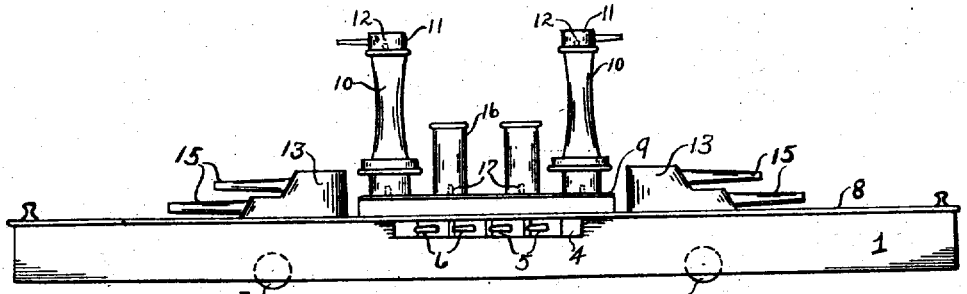
Figure 2:
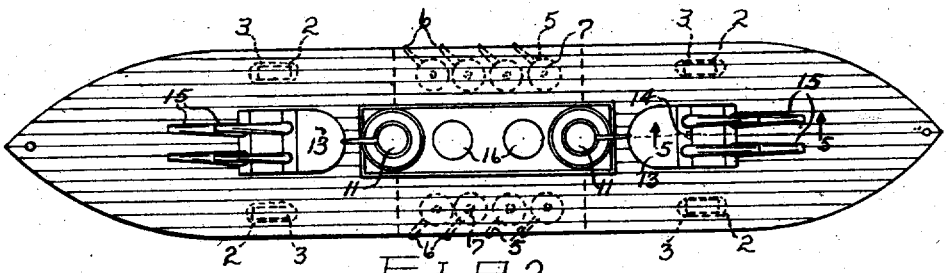
Figure 3:
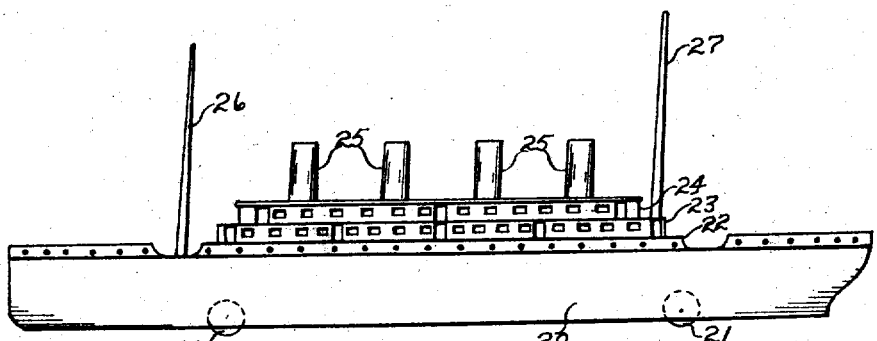
Figure 4:
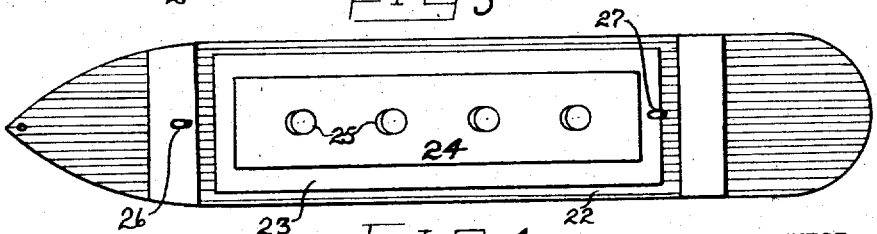
Figure 5:
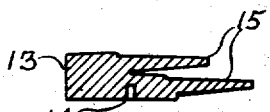

Fig. 1 is a side elevation of a boat embodying my improvements; Fig. 2 is a plan view of the same; Fig. 3 is a side elevation of another type of boat embodying the same invention; Fig. 4 is a plan view of the boat shown in Fig. 3; and Fig. 5 is a section on the line 5—5 of Fig. 2.

In Fig. 1 I have shown a toy boat constructed to resemble an American battleship, and consisting of a hull 1 of some buoyant material, such as thoroughly dried wood selected to be of substantially uniform density and specific gravity throughout. This hull member, which is preferably made up of a single piece of wood, is flat, both on its upper and lower surfaces, and the bottom surface is provided with a plurality of recesses 2, in which are mounted a series of rollers 3 arranged symmetrically with respect to the center line of the hull. These rollers are also of course mounted on parallel axes to permit of the boat having movement in either direction.

At the center of the upper portion the hull is recessed at 4, and in the recesses thus provided are mounted a series gun-carrying turrets 5, shown in plan in Fig. 2, to represent the secondary guns of an actual war ship. These turrets 5 carry miniature guns 6 and are pivotally mounted about parallel vertical axes in the form of pins 7.

Extending over the entire upper surface of the hull 1 is a deck 8 consisting of a single strip of relatively thin wood, which very much enhances the appearance of the article, and serves as a smooth uniform support for the various elements which make up the superstructure of the boat. This deck 8 is also lined or marked off to represent planking to further enhance its appearance. In the case of the battleship shown in Figs. 1 and 2 the superstructure consists of a longitudinally extending member 9, on which are removably and pivotally mounted masts 10 which support gun-carrying "fighting tops." These "fighting tops" are also pivotally mounted on the masts 10 and are removable therefrom, the pivots therefor being made in the form of pins 12. Adjacent to either end of the member 9 are gun-carrying turrets 13 which are removably and pivotally mounted on axes in the form of pins 14 mounted on the deck 8. Each of the turrets 13 carries four guns 15, although the number is immaterial, but these turrets are so constructed that the weight on either side of the axis or pin 14 is balanced so that when the turrets are swung to either side there is no change in the buoyancy of the vessel and no additional weight brought to either side of the center line. The smokestacks 16 are also removably mounted on pins 17 carried on the superstructure 9, and the turrets, masts and smokestacks may all be removed when desired.

In Figs. 3 and 4 I have shown a boat representing in miniature a passenger liner, this boat having a hull 20 which is constructed in the same manner as the hull 1 of the boat previously described, and is similarly provided with rollers 21 to permit of its movement on a horizontal surface. The other features of this passenger boat are of course modified to properly represent the appearance of an actual liner. The superstructure consists of a series of layers or plates 22, 23 and 24, on the upper of which are removably mounted smokestacks 25, while masts 26 and 27 are also mounted, the former on the deck or hull of the boat and the latter upon the plate 23.

The various layers or plates which make up the superstructure of this boat may be painted or marked as indicated in Fig. 3 to represent port holes, windows and doors as indicated.

It is extremely difficult in the manufacture of toy boats to produce a boat which will float evenly unless the boat is given some form of keel, or unless some ballast is provided in the lower part of the hull. It is of course impractical to construct a boat with a keel and also adapt it to move over a solid surface and have the appearance of a real boat. In order to accomplish these desired results I have made the hull of a single piece of specially selected buoyant material, such as dry wood of uniform density and specific gravity throughout, and have kept the weight of the superstructure below 25 per cent of the weight of the hull. In addition, the superstructure is exactly centrally mounted on the hull of the boat, and even in the case of the battleship shown, which has turrets which swing to either side, the weight of these turrets is so balanced as not to affect the distribution of the weight in the entire boat. With the rollers carried by the boat or hull and having their major portions disposed within the recesses, the boat is not only capable of movement over a solid surface but also has the proportions and therefore the appearance of a real boat, the rollers being practically invisible and the hull being close to the solid surface. In this way it is possible to secure a perfect floating of the boats in water, while at the same time the height of the hull is kept to such proportions that the boats have a natural and proper appearance even when resting on the floor.

Other modes of applying the principle of my invention may be employed instead of the one explained, change being made as regards the mechanism herein disclosed, provided the means stated in what is claimed or the equivalent of such stated means be employed.

I therefore particularly point out and distinctly claim as my invention:

1. In a combined toy land and water boat, a combination of a buoyant hull of dry wood of even density and thus of substantially uniform specific gravity throughout, a superstructure mounted centrally on said hull of limited lateral extent as compared with said hull, movable elements of irregular configuration comprised in said superstructure counterbalanced so as to at all times present equal amounts of weight along the median line of said hull, and rollers symmetrically disposed with respect to said median line so that said boat will be of relatively stable equilibrium whether used as an aquatic or as a land toy.

2. In a toy land and water boat, the combination of a flat bottomed hull of buoyant material of substantially uniform density throughout and provided with recesses for rollers in the lower surface thereof, a superstructure mounted on the said hull, and rollers on the hull and having their major portions disposed within the said recesses and adapted to allow movement of the said boat over a horizontal surface.

3. In a combined toy land and water boat, a combination of a buoyant hull consisting of dry wood of even density and thus of substantially uniform specific gravity throughout, the hull having roller recesses in the bottom surface symmetrically disposed with respect to the medial line of the hull, a superstructure mounted centrally on said hull of limited lateral extent as compared with said hull, and rollers carried by the hull in the recesses and projecting sufficiently far below the bottom surface of the hull to permit movement of the boat over a solid horizontal surface.

4. In a combined toy land and water boat, the combination of a flat bottomed hull composed of wood of substantially uniform density throughout and provided with recesses for rollers in the lower surface thereof, a super-structure mounted on the said hull, and rollers carried by the hull with their major portions disposed within the said recesses, whereby movement of the said boat in relatively stable equilibrium over a solid horizontal surface is permitted.

In testimony whereof I hereunto affix my signature this 30th day of January, 1925.

RAYMOND E. HUNT.